US009897197B2

(12) United States Patent
Schmidt et al.

(10) Patent No.: US 9,897,197 B2
(45) Date of Patent: Feb. 20, 2018

(54) VALVE SYSTEM FOR CONTROLLING A SYSTEM PRESSURE CONTROL SYSTEM

(71) Applicant: ZF Friedrichshafen AG, Friedrichshafen (DE)

(72) Inventors: Thilo Schmidt, Meckenbeuren (DE); Hans-Joachim Martin, Kressbronn (DE); Hans-Juergen Bader, Mochenwangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 450 days.

(21) Appl. No.: 14/248,739

(22) Filed: Apr. 9, 2014

(65) Prior Publication Data
US 2014/0305243 A1 Oct. 16, 2014

(30) Foreign Application Priority Data
Apr. 10, 2013 (DE) .................. 10 2013 206 254

(51) Int. Cl.
*F16K 11/07* (2006.01)
*F16H 61/00* (2006.01)
*F16H 61/02* (2006.01)

(52) U.S. Cl.
CPC ..... *F16H 61/0021* (2013.01); *F16H 61/0276* (2013.01); *F16K 11/07* (2013.01); *Y10T 74/20024* (2015.01)

(58) Field of Classification Search
CPC .. F16H 61/0021; F16H 61/0276; F16K 11/07; Y10T 74/20024
USPC .............. 137/625.6, 625.64, 625.69, 596.14, 137/596.15, 596.17, 596.18
See application file for complete search history.

(56) References Cited

U.S. PATENT DOCUMENTS

| 3,225,663 | A | * | 12/1965 | Pelisson | .................. B62D 5/09 137/106 |
| 3,763,746 | A | * | 10/1973 | Walters | .................. F15B 5/003 91/433 |
| 3,874,269 | A | * | 4/1975 | Walters | ............... F15B 13/0417 137/625.64 |
| 4,362,084 | A | * | 12/1982 | Walters | .................. F15B 11/05 137/625.64 |
| 4,598,626 | A | * | 7/1986 | Walters | .................. F15B 13/16 137/625.64 |

(Continued)

OTHER PUBLICATIONS

German Patent Office Search Report, dated Jan. 27, 2014.

*Primary Examiner* — John K Fristoe, Jr.
*Assistant Examiner* — Andrew J Rost
(74) *Attorney, Agent, or Firm* — Dority & Manning, P.A.

(57) ABSTRACT

A valve system for controlling a system pressure control system, in particular a hydraulic control unit of an automatic transmission, includes a multi-stage system pressure valve, a pilot valve and a control valve with a control piston downstream from the pilot valve that governs the pressure at a differential area of the system pressure valve, depending on the pilot pressure. The pilot pressure/system pressure characteristic curve features a continuous development, and whereas, from a predefined pilot pressure, on the basis of a sudden change to the dependency of the change to the system pressure as a function of the change to the pilot pressure, the gradient of the system pressure as a function of the pilot pressure is significantly steeper than that prior to the predefined pilot pressure.

3 Claims, 1 Drawing Sheet

(56) References Cited

U.S. PATENT DOCUMENTS

| | | | |
|---|---|---|---|
| 4,785,849 A * | 11/1988 | Masuda | G05D 16/2093 137/625.6 |
| 5,251,443 A | 10/1993 | Ehrlinger et al. | |
| 5,911,244 A | 6/1999 | Long et al. | |

* cited by examiner

VALVE SYSTEM FOR CONTROLLING A SYSTEM PRESSURE CONTROL SYSTEM

FIELD OF THE INVENTION

This invention relates to a valve system for controlling a system pressure control system, in particular a hydraulic control unit of an automatic transmission.

BACKGROUND

Hydraulic systems, in particular in hydraulic control units of automatic transmissions, typically use a pilot-operated pressure relief valve, hereinafter referred to as system pressure valve, in order to adjust the system pressure in such a manner that the power consumption of the pump of the transmission is not unnecessarily high, and/or that the actuating elements are supplied with at least the amount of pressure that ensures safe operation of the system.

In order to adjust the system pressure, this is typically controlled by a pilot valve in such a manner that it may be continuously adjusted between a minimum pressure that is at least necessary for operation and a maximum pressure that is necessary for safe insertion and for full power transmission of the shift elements.

In hydraulic control units of automatic transmissions, the system pressure range may be varied in such a manner that the maximum and minimum system pressure are found in a very high relationship with each other, by which the valve reinforcement of the system pressure valve between the system pressure and the pilot pressure valve takes on a value of >5. In the low pressure range, this leads in particular to position inaccuracies in a negative manner, which may result in an increased pump absorption torque and thus increased consumption.

SUMMARY OF THE INVENTION

This invention is subject to a task of specifying a valve system for controlling a system pressure control system, in particular a hydraulic control unit of an automatic transmission, through the use of which the position inaccuracies that arise in the lower pressure range under the state of the art are largely avoided. Additional objects and advantages of the invention will be set forth in part in the following description, or may be obvious from the description, or may be learned through practice of the invention.

In particular, a high resolution between system pressure and pilot pressure is to be achieved in the low pressure range.

These tasks are solved by the characteristics of the embodiments of a valve system claimed herein. Additional arrangements and advantages in accordance with the invention emerge from the following description.

Accordingly, what is proposed is a valve system for controlling a system pressure control system, in particular a hydraulic control unit of an automatic transmission, comprising a multi-stage system pressure valve, a pilot valve and a control valve with a control piston downstream from the pilot valve, which governs the pressure at a differential area of the system pressure valve, depending on the pilot pressure.

Thereby, the system pressure may be controlled in such a manner that, in a low pressure range with low valve reinforcement of the system pressure, there is a high resolution between system pressure and pilot pressure, whereas, in a second, higher pressure range of the system pressure, a low valve resolution is achieved, which is used to achieve the maximum system pressure.

In accordance with the invention, the switching of the system pressure ranges takes place without a break in the pilot pressure/system pressure characteristic curve, but on the basis of a sudden change to the dependency of the change to the system pressure as a function of the change to the pilot pressure in a desired pressure range.

This is achieved by the fact that the control valve corresponds to a pressure-reducing valve with inverted characteristics, which at low system pressure adjusts a control pressure, which is higher than the supply pressure at the control valve, by which the control valve is located in a fully open position, which produces a direct pressure connection between system pressure and the system pressure valve.

Upon an increase in the pilot pressure, the supply pressure, and at the same time the control pressure of the control valve, increase continuously. At the moment at which the control pressure of the control valve and the supply pressure are the same, the control valve proceeds into a modulation position, such that, upon a further increase in the pilot pressure, the control pressure is lower than the system pressure.

The concurrent increase in the pilot pressure and the reduction in the control pressure at the system pressure valve, each acting in an opposite direction, lead to a split in the system pressure characteristics.

Thus, in the lower pressure range of the pilot pressure (for example, between 0-2.5 bar), a good pressure position accuracy of the system pressure (for example, 3.5-10 bar) can be achieved, while, in the higher pressure range of the pilot pressure (for example, between 2.5-5 bar), the system pressure may vary in the range between 10-40 bar. In this high pressure range, high requirements for position accuracy, like those in the lower pressure range, are not required.

This means that the pilot pressure/system pressure characteristic curve features a continuous development, and that, from a predefined pilot pressure, on the basis of a sudden change to the dependency of the change to the system pressure as a function of the change to the pilot pressure, the gradient of the system pressure as a function of the pilot pressure is significantly steeper than that prior to the predefined pilot pressure.

Within the framework of a further variant of the invention, the control valve has an increasing pilot pressure/control pressure characteristic curve, and, from a predefined pilot pressure, for example from a pressure of 2.5 bar, acts on a differential area of the system pressure valve, which additionally affects the pilot pressure. Below the predefined pilot pressure, for example below 2.5 bar, the control pressure is constant and does not additionally affect the pilot pressure. Above the predefined pilot pressure, the control pressure increases in a manner clearly steeper than that in the low pilot pressure range.

In addition, within the framework of an additional form of the invention, it can be provided that the even system pressure range is controlled in the high pilot pressure range.

BRIEF DESCRIPTION OF THE DRAWINGS

In the following, the invention is more specifically illustrated as an example on the basis of the attached figures. The following are represented in these.

DETAILED DESCRIPTION

Figure 1:
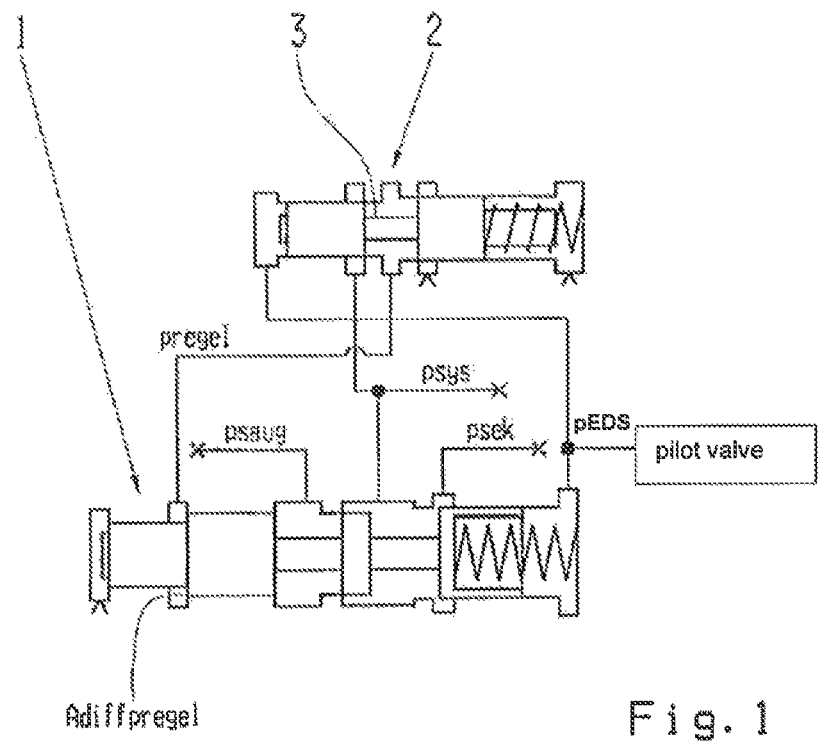
FIG. 1: a schematic view of an embodiment of the valve system according to the invention for controlling a system pressure control system.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In accordance with the invention, and with reference to FIG. 1, the valve system in accordance with the invention for controlling a system pressure control system comprises, in particular, a hydraulic control unit of an automatic transmission of a multi-stage system pressure valve 1, a pilot valve (labeled in FIG. 1) and a control valve 2 with a control piston 3 downstream from the pilot valve, which governs the pressure at a differential area "Adiffpregel" of the system pressure valve 1, depending on the pilot pressure (pEDS).

The system pressure valve features a channel for the system pressure "psys", a channel for the secondary circuit pressure "psek", through which excess oil is led to the secondary circuit, and a channel through which, if the excess oil exceeds a predefined pressure, the excess oil is led with the pressure "psaug" to the suction side of the pump. A channel for the control pressure "pregel" is also provided.

Figure 2:
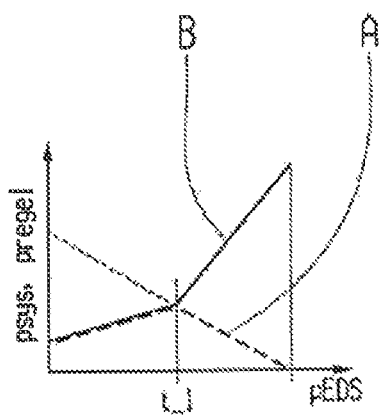
FIG. 2: a diagram for illustrating the pilot pressure/system pressure characteristic curve and the pilot pressure/control pressure characteristic curve in accordance with one embodiment of the invention.

The control valve 2 is structured as a ventilated 3/2-way valve and, in accordance with the invention, corresponds to a pressure-reducing valve with an inverted characteristic, which at low system pressure adjusts a control pressure, which is higher than the supply pressure at the control valve 2, by which the control valve 2 is located in a fully open position, which produces a direct pressure connection between system pressure and the system pressure valve, whereas, upon an increase in the pilot pressure, the supply pressure, and at the same time the control pressure of the control valve 2, increase continuously. In this lower pressure range of the pilot pressure, a high resolution between the system pressure and the pilot pressure, thus a good pressure position accuracy of the system pressure, can be achieved, as can be seen in FIG. 2. Thereby, this curve "A" represents the development of the control pressure as a function of the pilot pressure, whereas curve "B" represents the development of the system pressure as a function of the pilot pressure.

At the moment at which the control pressure of the control valve 2 and the supply pressure are the same, the control valve 2 proceeds into a modulation position, such that, upon a further increase in the pilot pressure, the control pressure is lower than the system pressure. The concurrent increase in the pilot pressure and the reduction in the control pressure at the system pressure valve, each acting in an opposite direction, lead to a split in the system pressure characteristics as a function of the pilot pressure.

The moment at which the control pressure of the control valve 2 and the supply pressure are equal is designated in FIG. 2 as "t_1". As is evident in FIG. 2, a continuous pilot pressure/system pressure characteristic curve arises, which features a bend at point in time t_1. At this point in time, the gradient of the system pressure as a function of the pilot pressure is considerably steeper than that prior to this point in time.

Through the concept according to the invention, in the higher pressure range of the pilot pressure, i.e. from the point in time t_1, a low valve resolution is achieved, whereas the system pressure in the range of 10-40 bar is varied and can achieve the maximum value.

In an advantageous embodiment, the switching of the system pressure ranges takes place without a break in the pilot pressure/system pressure characteristic curve, on the basis of a sudden change to the dependency of the change to the system pressure as a function of the change to the pilot pressure in a desired pressure range.

Modifications and variations can be made to the embodiments illustrated or described herein without departing from the scope and spirit of the invention as set forth in the appended claims.

The invention claimed is:

1. A valve system for controlling a system pressure control system such as a hydraulic control unit of an automatic transmission, comprising:
   a multi-stage system pressure valve;
   a pilot valve; and
   a control valve with a control piston downstream of the pilot valve, the control valve governing control pressure at a differential area of the system pressure valve as a function of pilot pressure;
   wherein the control valve comprises a first operational configuration and a second operational configuration, in the first operational configuration the control valve is in a more open position than in the second operational configuration, such that in the first operational configuration, a continuous characteristic curve of system pressure from the system pressure valve as a function of pilot pressure is developed, and at a predefined pilot pressure, the control valve switches to the second operational configuration in which the control valve moves to a modulation position wherein, the configuration of the control valve in the modulation position is solely responsible for producing a distinct change in gradient or slope of the system pressure curve as a function of pilot pressure as compared to the slope or gradient with the control valve in the first operational configuration, wherein a further increase in pilot pressure from the predefined pilot pressure causes the system pressure curve to remain at the distinct change in gradient or slope of the system pressure curve as a function of pilot pressure as compared to the slope or gradient with the control valve in the first operational configuration, and
   wherein the system pressure valve receives an input from the pilot valve and the control valve receives an input from the pilot valve.

2. The valve system as in claim 1, wherein the control valve is a ventilated multi-way pressure reducing valve with an inverted operating characteristic such that at low system pressure, the control valve is fully open and defines a direct pressure connection between system pressure and the system pressure valve; wherein control pressure of the control valve increases continuously with pilot pressure increase up to the predefined pilot pressure where control pressure equals system pressure; wherein upon further increase of pilot pressure, control pressure lowers to less than system pressure such that the increase in pilot pressure and decrease in control pressure at the system pressure valve act in opposite direction and produce a distinct increase in the system pressure curve as a function of pilot pressure.

3. The valve system as in claim 1, wherein the control valve has an increasing pilot pressure/control pressure characteristic curve and at pilot pressures less than the predefined pilot pressure, the control pressure is constant and does not affect pilot pressure, and whereas at pilot pressure above the predefined pilot pressure, the control pressure increases at a distinctly steeper slope or gradient as compared to pilot pressure below the predefined pilot pressure.

* * * * *